(12) United States Patent
Boucherie

(10) Patent No.: US 6,379,139 B1
(45) Date of Patent: Apr. 30, 2002

(54) TOOL FOR THE INJECTION MOLDING OF TOOTHBRUSH BODIES CONSISTING OF SEVERAL PLASTIC COMPONENTS

(75) Inventor: Bart Gerard Boucherie, Izegem (BE)

(73) Assignee: G. B. Boucherie, B.V., Izegem (BE)

( * ) Notice: Subject to any disclaimer, the term of this patent is extended or adjusted under 35 U.S.C. 154(b) by 11 days.

(21) Appl. No.: 09/670,101

(22) Filed: Sep. 26, 2000

(30) Foreign Application Priority Data

Sep. 29, 1999 (DE) .................................... 299 17 164 U

(51) Int. Cl.⁷ .............................................. B29C 45/14
(52) U.S. Cl. ................. 425/129.1; 264/328.8; 264/328.11; 425/130; 425/572; 425/574
(58) Field of Search ................. 425/130, 572, 425/574, 127, 129.1; 264/328.8, 328.11

(56) References Cited

U.S. PATENT DOCUMENTS 5,256,048 A * 10/1993 Jacobs et al. ................ 425/572

FOREIGN PATENT DOCUMENTS

EP       0 678 368 A1    10/1995
WO       WO 99/01055     1/1999

* cited by examiner

Primary Examiner—Tim Heitbrink
(74) Attorney, Agent, or Firm—Nixon Peabody LLP; Stuart J. Friedman

(57) ABSTRACT

A tool for the injection molding of toothbrush bodies consisting of at least two different, consecutively injection molded plastic components, comprising a pair of mold parts that can be moved relative to each other and that together form groups of parallel mold cavities, wherein one of the mold parts for each group of mold cavities has a recess into which a mold insert can be filled, partial cavities are formed in the mold inserts, each corresponding to a head area of a toothbrush body, two of four groups of mold cavities form a first group pair in which the first plastic component is injection molded, two more of the four groups of the mold cavities form a second group pair in which the second plastic component is injection molded; the mold cavities in each group are parallel to each other and to those of the other group pair; one group of each pair of mold cavities is offset perpendicular to a lengthwise direction of the mold cavities with respect to the other group; the mold cavities of a group of each group pair have head ends that are oriented so as to face each other.

2 Claims, 5 Drawing Sheets

Figure 1:
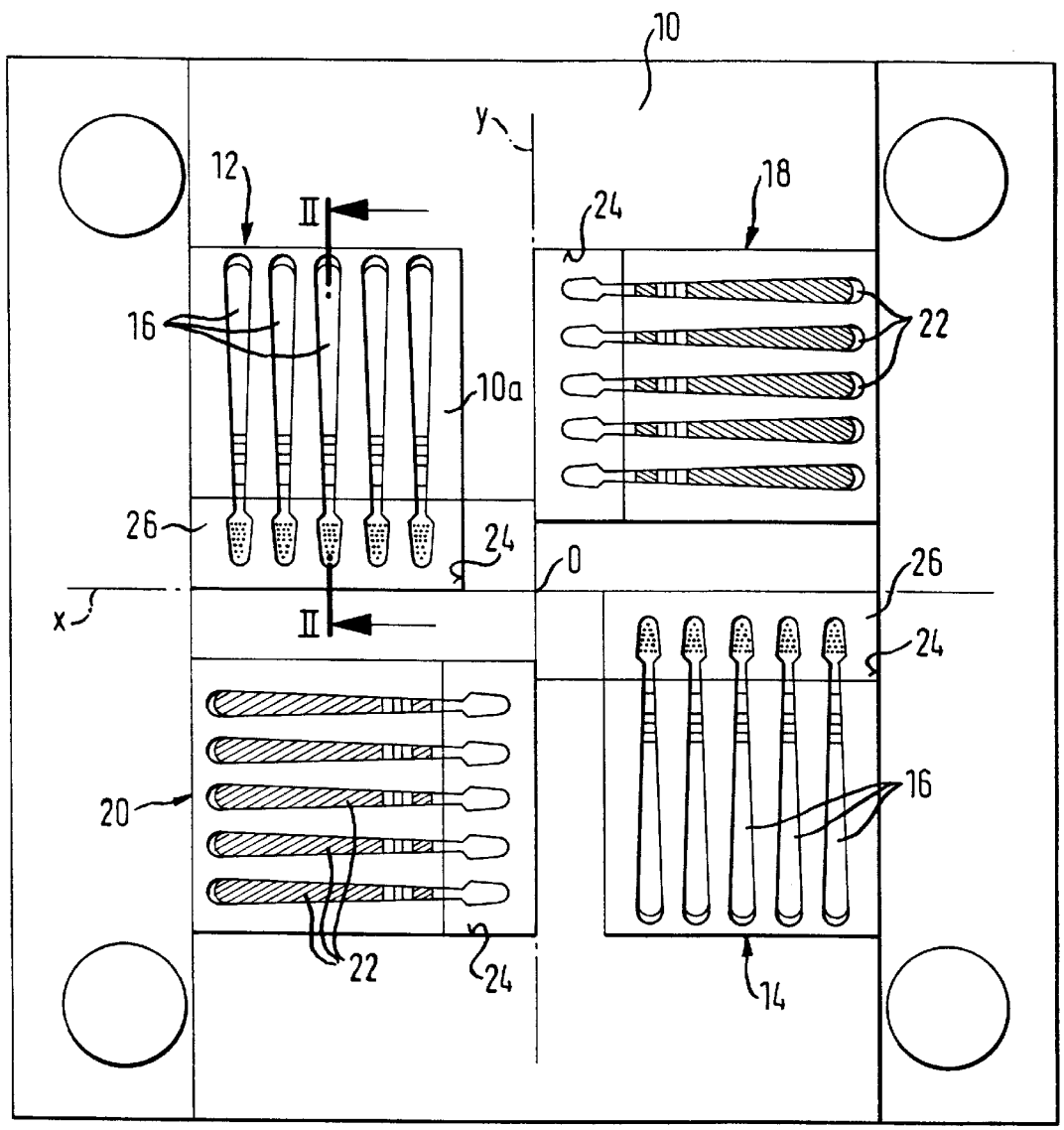

TOOL FOR THE INJECTION MOLDING OF TOOTHBRUSH BODIES CONSISTING OF SEVERAL PLASTIC COMPONENTS

The invention relates to a tool for the injection molding of toothbrush bodies consisting of two different, plastic components that are injection molded consecutively.

A tool for the injection molding of toothbrush bodies consisting of two consecutively injection molded plastic components is known from EP 0,678,368 A1. It comprises two mold parts that can be moved relative to each other and that together form several groups of parallel mold cavities. For each group of mold cavities, one of the mold parts has a recess into which a mold insert can be inserted. The mold inserts have partial cavities that correspond to the head area of the toothbrush bodies. The first plastic component is injected into two of the total of four groups of mold cavities while the second plastic component is injected into the two remaining groups. After the injection of the first plastic component, the mold inserts are lifted out of the mold cavities with the adhering blanks and placed into the mold cavities of the other group pair for purposes of injecting the second plastic component.

The mold inserts are arranged along the circumference of a circular rotary disk by means of which the mold inserts can be moved between the groups of the mold cavities. This results in a configuration of the mold cavities that generally faces radially away from the mid-point of the rotary disk. An unused surface area is left on the mold parts between the groups of mold cavities.

Through the invention, a considerably more compact arrangement of the groups of mold cavities is achieved.

According to a first aspect of the invention, the mold cavities of each group pair are arranged parallel to each other and to the mold cavities of the other group pair. One group of each group pair of mold cavities is offset with respect to the other group, perpendicular to the lengthwise direction of the mold cavities. The head ends of the mold cavities of one group of each group pair are oriented so as to face each other. As a result of this arrangement of the groups of mold cavities, the available surface area of the preferably rectangular or square mold parts is optimally utilized. The groups of mold cavities can be arranged closely adjacent to the mold parts. The groups of mold cavities, relative to a rectangle that surrounds them, are preferably arranged diagonally across from each other, whereby in each case, two groups of mold cavities diagonally across from each other constitute one group pair whose mold cavities are oriented parallel to each other but in the opposite direction. The head areas of the mold cavities of each group pair are in a row or in two adjacent rows so that the corresponding mold inserts can be mounted on a shared carrier that is lifted and rotated by 90° in order to transfer the blanks that have been injected with the first plastic component from the first group pair of mold cavities into the mold cavities of the second group pair.

According to a second aspect of the invention, the lengthwise direction of the mold cavities is oriented tangentially to an orbit along which the mold inserts are moved during the transfer from one group of mold cavities to another. This embodiment is especially advantageous if the brush bodies are injection molded from more than two plastic components.

Figure 2:
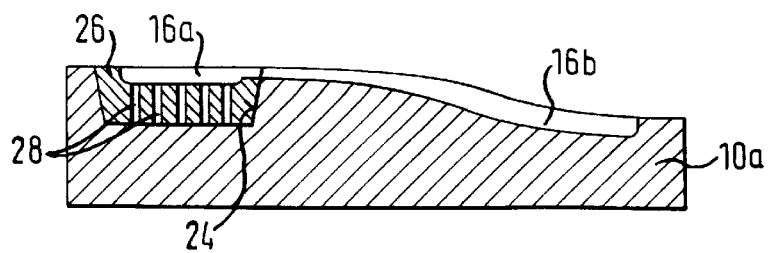
Figure 3:
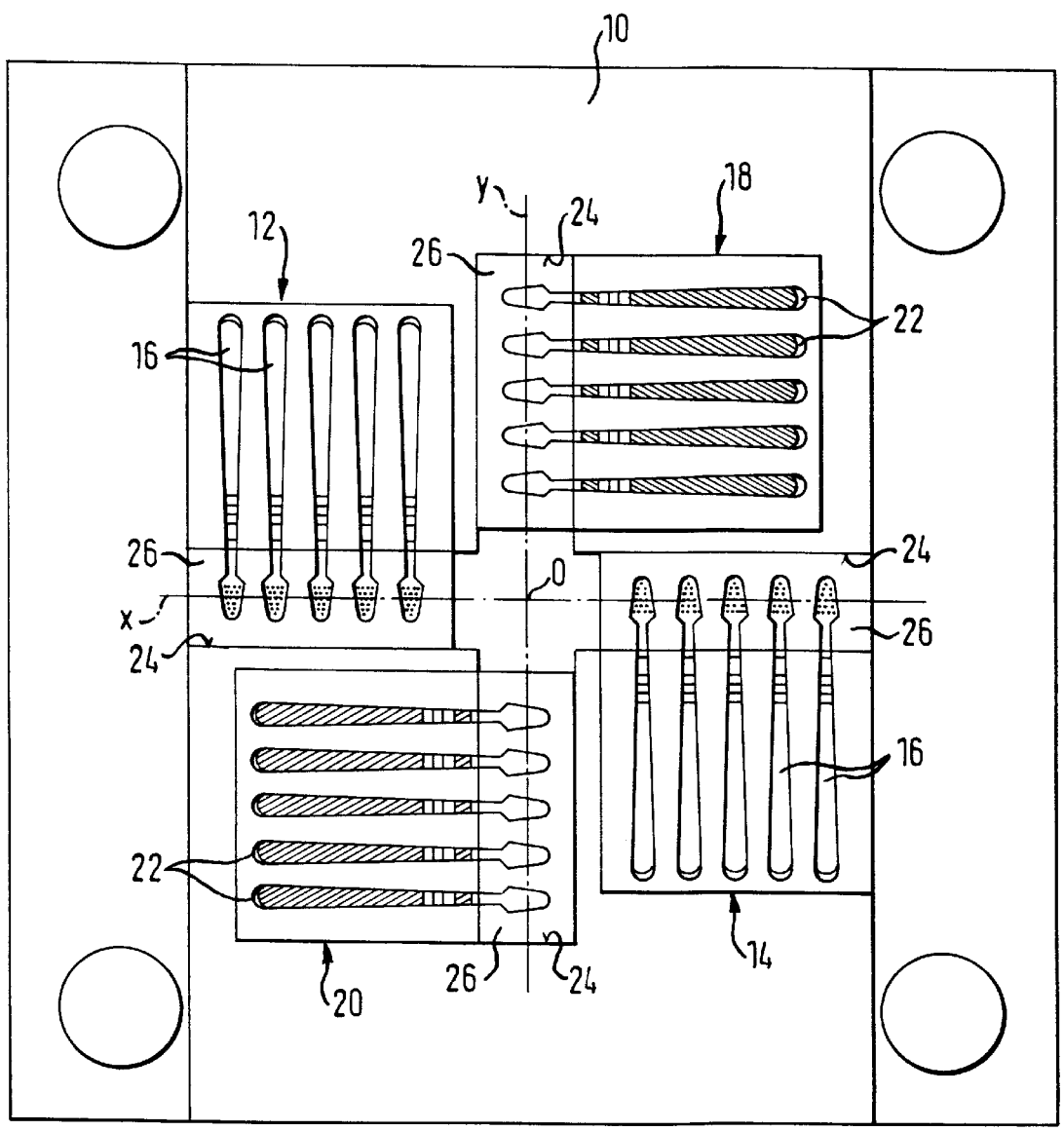
Figure 4:
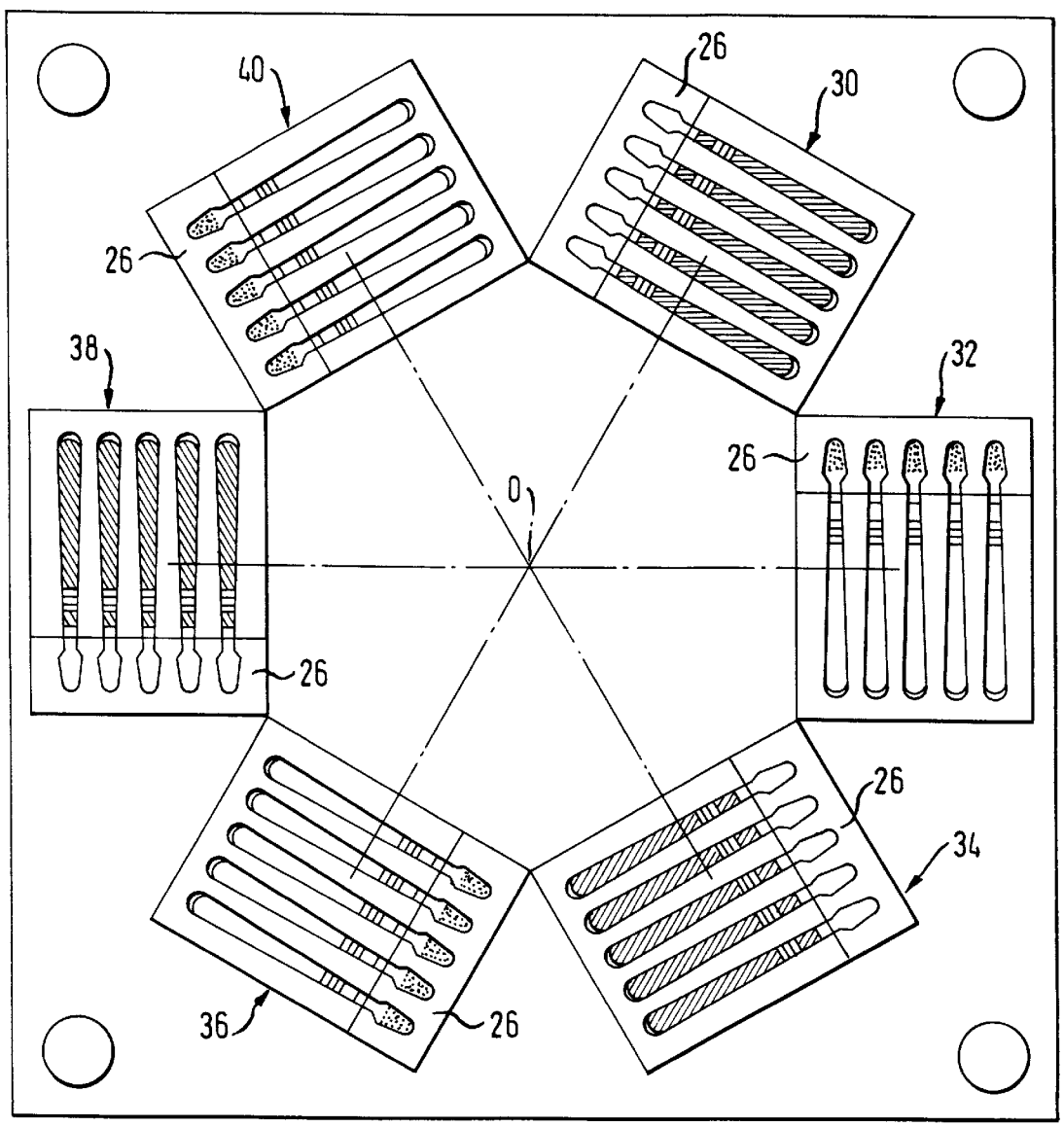
Figure 5:
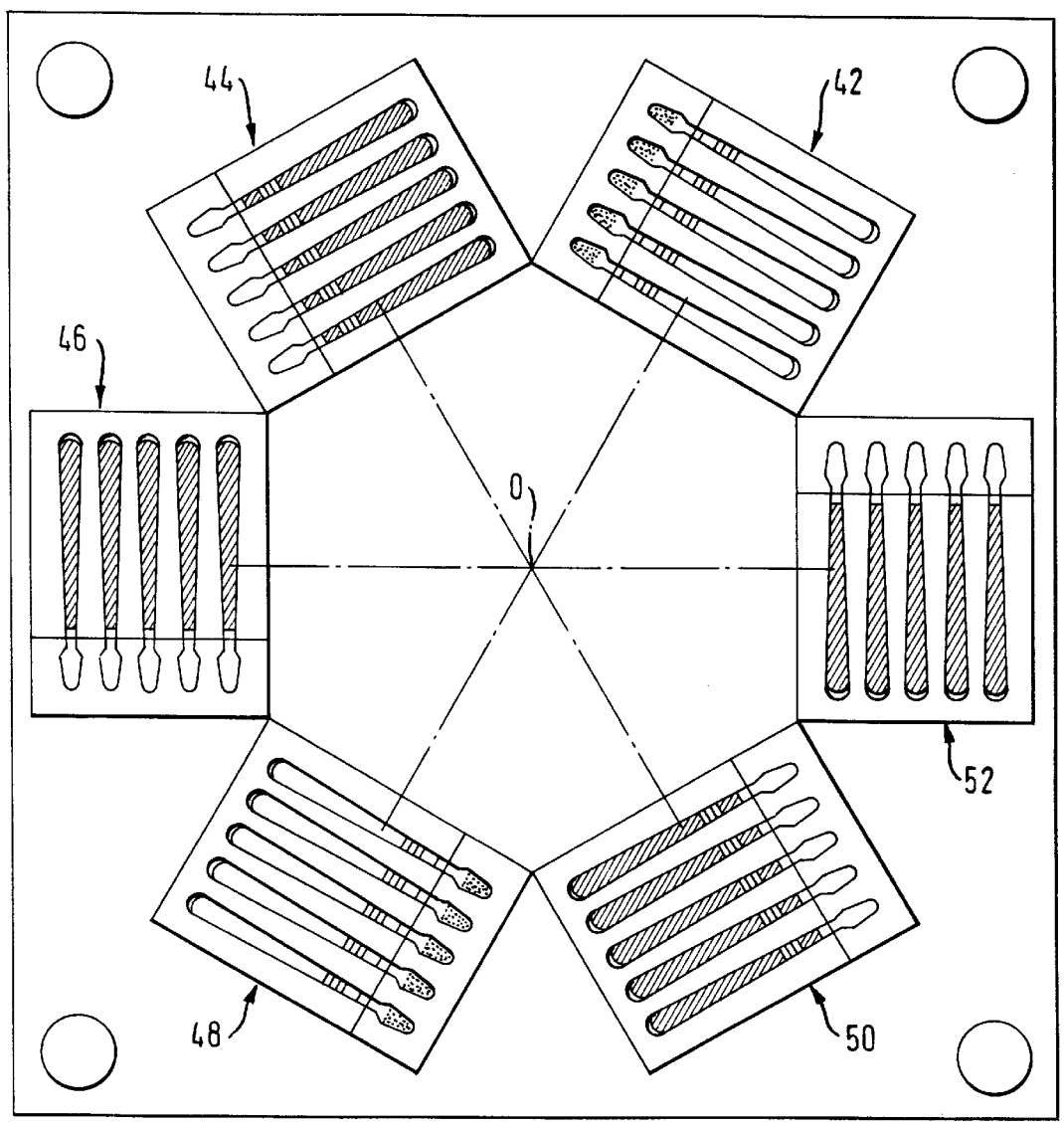
Figure 6:
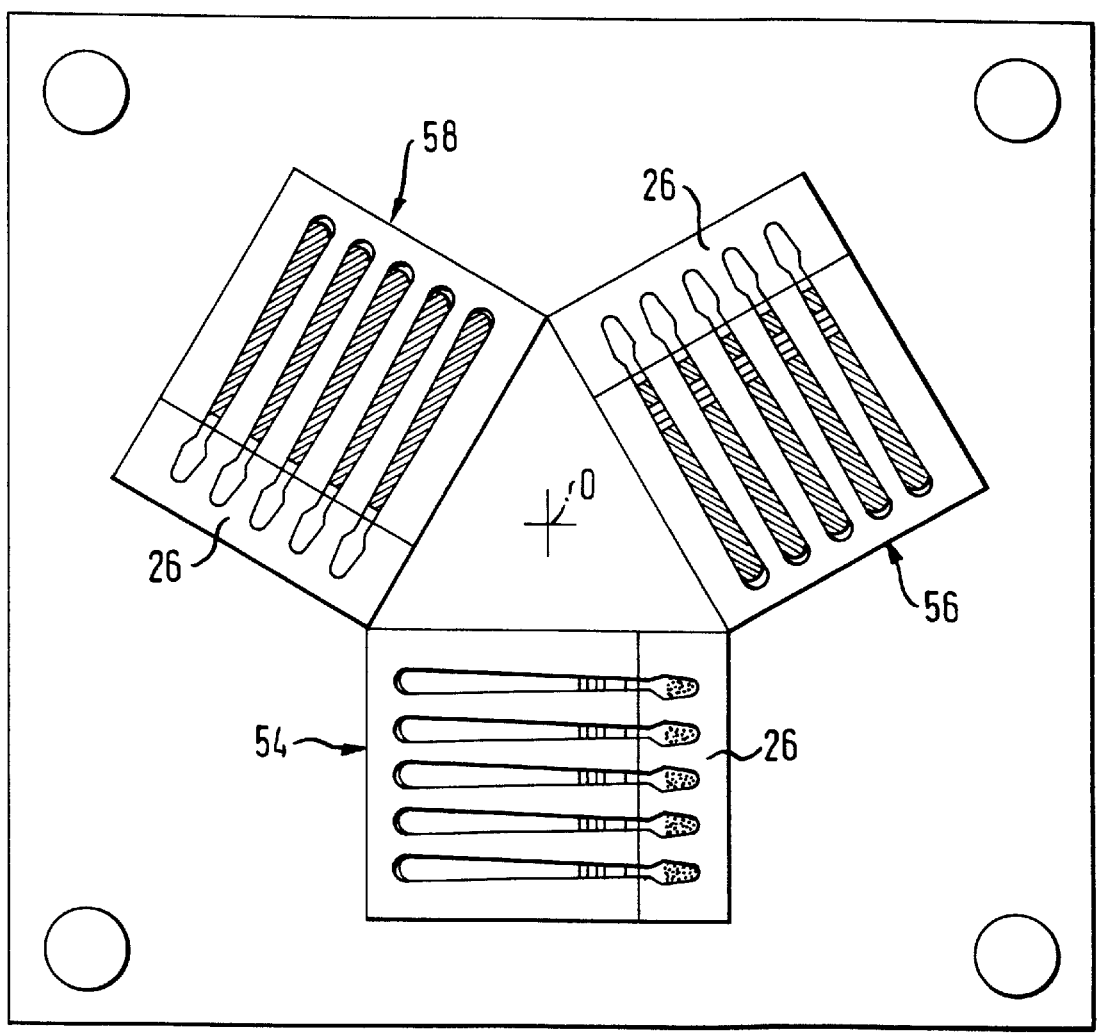

Additional features and advantages of the invention ensue from the following description of several embodiments and from the drawings to which reference is made. The following is shown:

FIG. 1—a top view of a first embodiment of a mold part of the tool;

FIG. 2—a section along Line II—II in FIG. 1;

FIG. 3—a top view of a mold part according to a second embodiment of the tool;

FIG. 4—a top view of a mold part according to a third embodiment;

FIG. 5—a top view of a mold part according to a fourth embodiment;

FIG. 6—a top view of a mold part according to a fifth embodiment.

When it comes to the tool for the injection molding of toothbrush bodies, each of the figures only shows a fixed mold part 10 that mates with a complementary, movable mold part in a known manner. In the mold part 10, there are two groups 12, 14 of mold cavities 16 for the injection molding of blanks consisting of a first plastic component and two groups 18, 20 of mold cavities 22 for the injection molding of the second plastic component. The groups 12 and 14 of mold cavities 16 form a first group pair and the groups 18, 20 of mold cavities 22 form a second group pair. The groups of each group pair 12, 14 and 18, 20 are arranged diagonally across from each other relative to a rectangle that surrounds the groups. If a right-angled coordinate system with the origin O is laid in the middle between the groups of mold cavities 16, 22, then one side of groups 12 and 14 is adjacent to the x-axis and one side of groups 18 and 20 is adjacent to the y-axis. Within each group pair 12, 14 and 18, 20, the mold cavities 16, 22 are oriented parallel to each other but in the opposite direction so that the head areas of the mold cavities are oriented so as to face each other. Furthermore, each mold cavity 16, 22 of one group of each group pair is offset at a right angle to the lengthwise direction of the mold cavities with respect to the mold cavities of the other group so that, in FIG. 1, the groups 12, 14 lie on opposite sides of the x-axis and the groups 18, 20 lie on opposite sides of the y-axis.

Each group 12, 14, 18, 20 of mold cavities 16, 22 is provided with a recess 24 which extends over the head areas of the mold cavities and into which a mold insert 26 can be inserted. As shown in FIG. 2, a partial cavity 16a corresponding to the head area of a toothbrush body is formed in the mold insert 26; the other areas 16b of the mold cavities are formed in a mold block 10a. The mold inserts 26 are provided with openings 28 for receiving the tufts of bristles.

The mold inserts 26 are preferably mounted on a shared carrier that can be rotated in increments of 90° around an axis that passes through the mid-point O.

During operation, the mold inserts 26 for injection molding blanks consisting of the first plastic component are in the mold blocks 10a of the first group pair 12, 14 after they have been previously loaded with tufts of bristles. After the injection molding of the first plastic component, the mold inserts 26 are lifted out of the mold blocks 10a, whereby the injected blanks adhere to the former. The rotation by 90° positions the mold inserts 26 with the blanks above the mold cavities 22 of the second group pair 18, 20 and lowers them, a process in which the blanks are placed into the mold cavities 22. The second plastic component is now injected into the mold cavities 22. The completely injection molded toothbrush bodies are ejected in a subsequent molding cycle.

As an alternative to the embodiment described, the mold inserts 26 are not provided with openings 28 but rather with hole punches which, during the injection of the first component, create a perforated field in the head area of the blanks for the insertion of tufts of bristles.

In the first described embodiment of the mold inserts 26 with openings 28, it can be advantageous to mount these mold inserts onto a shared carrier in a detachable manner so that they can be transported to a bristle tuft loading station and brought back to the tool after they have been loaded with tufts of bristles. In contrast, in the case of the embodiment with hole punches, the mold inserts 26 can be permanently attached to the shared carrier.

In the embodiment shown in FIG. 3, the groups 12, 14 as well as 18, 20 of mold cavities 16 and 22 are fundamentally arranged in the same manner as in the embodiment according to FIG. 1, but with the special feature that the recesses 24 for each of the group pairs 12, 14 and 18, 20 are arranged in a row. Therefore, once again relative to a shared right-angled coordinate system whose origin O is located in the mid-point between the groups 12, 14 and 18, 20, the recesses 24 of the groups 12 and 14 are intersected by the x-axis while the recesses 24 of the groups 18 and 20 are intersected by the y-axis. As a comparison of FIGS. 1 and 3 shows, in the embodiment according to FIG. 3, the available surface area of the mold part 10 is even better utilized than in the embodiment according to FIG. 1.

The embodiments described above are a first method of solution in which the surface area of a square or rectangular mold can be optimally utilized to accommodate the groups of mold cavities.

The embodiments shown in FIGS. 4 through 6, however, are better suited when toothbrush bodies consisting of more than two plastic components are injection molded.

In the embodiment according to FIG. 4, a total of six groups 30, 32, 34, 36, 38, 40 having parallel mold cavities is provided. The groups 30 through 40 of mold cavities are arranged at equal angular distances of 60°, relative to an orbit around the shared mid-point O along which the corresponding mold inserts 26 are moved when they are transferred between the groups. The lengthwise direction of the mold cavities is oriented tangentially to the orbit along which the mold inserts 26 are moved. The groups 30 through 40 of mold cavities are each consecutively associated with different plastic components in the circumferential direction of this orbit. The first plastic component is injected into the mold cavities of the groups 32, 36 and 40 while the second plastic component is injected into the mold cavities of the groups 30, 34 and 38.

In the embodiment shown in FIG. 5 as well, six groups of mold cavities are arranged in the same manner as in the embodiment of FIG. 4. In this embodiment, however, the toothbrush bodies are injection molded from three plastic components. Thus, in FIG. 5, a first group 42 for the first component, a second group 44 for the second component, a third group 46 for the third component, a fourth group 48 for the first component, a fifth group 50 for the second component and a sixth group 52 for the third component follow each other consecutively in the circumferential direction.

The embodiment shown in FIG. 6 is also intended for brush bodies consisting of three plastic components. However, there are only three groups of parallel mold cavities: a first group 54 for the first plastic component, a second group 56 for the second plastic component and a third group 58 for the third plastic component. The groups of mold cavities are arranged at angular distances of 120°, relative to an orbit along which the mold inserts 26 are moved when they are transferred between the various groups.

What is claimed is:

1. A tool for the injection molding of toothbrush bodies consisting of at least two different, consecutively injection molded plastic components, comprising a pair of mold parts that can be moved relative to each other and that together form groups of parallel mold cavities, wherein one of the mold parts for each group of mold cavities has a recess into which a mold insert can be fitted, partial cavities are formed in the mold inserts, each corresponding to a head area of a toothbrush body, two of four groups of mold cavities form a first group pair in which the first plastic component is injection molded, two more of the four groups of the mold cavities form a second group pair in which the second plastic component is injection molded;

the mold cavities in each group pair are parallel to each other and to those of the other group pair;

one group of each group pair of mold cavities is offset perpendicular to a lengthwise direction of the mold cavities with respect to the other group;

the mold cavities of a group of each group pair have head ends that are oriented so as to face each other.

2. Tool according to claim 1, wherein the groups of mold cavities are arranged diagonally across from each other, relative to a rectangle that surrounds said groups.

* * * * *